Patented Feb. 22, 1949

2,462,448

UNITED STATES PATENT OFFICE 2,462,448

METHOD FOR THE CATALYTIC PRODUCTION OF OXO-CARBONYL COMPOUNDS

Gerald M. Whitman, Claymont, Del., assignor to E. I. du Pont de Nemours & Company, Wilmington, Del., a corporation of Delaware No Drawing. Application September 5, 1946, Serial No. 695,039

13 Claims. (Cl. 260—599)

1

This invention relates to the production of oxo-carbonyl compounds. More particularly, it relates to the production of oxo-carbonyl compounds from olefinic unsaturated compounds.

Heretofore, hydrogenation catalysts consisting of metals of group VIII of the periodic table of elements, especially iron, cobalt, and nickel, have been proposed for the carbonylation, that is the introduction of C=O into the molecule, of olefins to produce carbonyl compounds. However, these carbonylation catalysts effect substantial conversion of the aldehydes and ketones formed to alcohols and other by-products. Furthermore, these catalysts are difficult to use in continuous operation systems because they form with carbon monoxide volatile carbonyl complexes which are rapidly removed from the catalyst zone, and consequently the catalyst must be continuously replenished. These carbonyl complexes also lead to undue contamination of the reaction product, thereby increasing the difficulty of purification. Another disadvantage with these types of catalysts, for example cobalt, is their tendency to cause isomerization of the olefin under the conditions required for operation in the carbonylation process.

This invention has as an object the provision of a new catalytic process for the carbonylation of olefinic unsaturated compounds. Another object is the provision of a method for the production of oxo-carbonyl compounds, that is aldehydes and ketones. A further object is to provide a catalytic process for the production of oxo-carbonyl compounds which avoids disadvantages of the prior art catalytic methods. Still another object is to provide a method for producing hexahydrobenzaldehyde. A still further object is the production of valeraldehydes from butadiene. Other objects will appear hereinafter.

These objects are accomplished by the following invention which comprises reacting an olefinic unsaturated compound under superatmospheric pressure and at a temperature of at least 100° C. with a mixture of carbon monoxide and hydrogen in the presence of a metal from group II of the periodic table of elements having an atomic number from 12 to 30.

Since the process of the present invention is carried out under superatmospheric pressure, the operation requires means for compressing the reactants, pressure-resistant reaction vessels, heating and agitating means, connecting lines, gauges, controlling devices, and the like. Preferably, means are also provided for periodically

2 repressuring the reactor as the reaction proceeds.

One manner of operating the process of this invention consists in charging a pressure-resistant vessel with the olefinic unsaturated compound and catalyst. If desired, the pressure-resistant vessel can also be charged with a volatile liquid reaction medium. This charging operation is preferably carried out after purging the reaction vessel free of oxygen with deoxygenated nitrogen or other inert gas. The vessel is then closed, placed in a shaker machine provided with a heater, and connected to a reservoir of carbon monoxide and hydrogen. Controlling and recording thermocouples are placed in position; the vessel is pressured with carbon monoxide and hydrogen; and heating and agitation are started. Throughout the reaction period, the pressure is maintained within the desired range by periodically repressuring with a mixture of carbon monoxide and hydrogen. Completion of reaction is usually evidenced by cessation of gas absorption, after which the reaction vessel is allowed to cool, opened, the contents discharged and filtered, and the product isolated.

This invention is applicable to olefinic organic unsaturated compounds generally and particularly to the olefinic hydrocarbons and olefinic unsaturated compounds containing, in addition to the ethylenic linkages, ether, ester, ketone and aldehyde groups, although the olefinic hydrocarbons are preferred because ordinarily these give more clean-cut reactions. Especially preferred because of low cost and availability are the olefinic hydrocarbons containing not more than two ethylenic linkages, and the monoolefinic hydrocarbons.

Various mixtures of carbon monoxide and hydrogen may be employed in the process of this invention. The molar ratio of carbon monoxide to hydrogen may range from about 1:4 to 4:1. In general, however, it is preferable to keep the molar ratio of the two gases at about 1:1. Irrespective of the molar ratio of the carbon monoxide/hydrogen mixture, the amount of carbon monoxide injected into the reactor should be at least one mole, and preferably at least 10 moles, for each ethylenic bond of the compound being carbonylated to obtain complete conversion of the olefinic reactant.

In the practice of this invention a group II metal having an atomic number from 12 to 30, which includes magnesium, calcium, and zinc, can be used as a catalyst. Generally, the amount of catalyst employed may vary within the range of from 0.1% to 20% on the weight of the olefinic unsaturated compound being carbonylated. It is preferable, however, to employ between 1 and 10% catalyst since ordinarily these amounts give the best results.

In general, the process of this invention is operative at temperatures of from 100° C. to 400° C. and even up to 500° C., while optimum results are usually obtained within the range of from 100° C. to 300° C.

Although the process is operative at total pressures in excess of one atm., generally, it is preferable to operate the process within the range of from 20 to 1200 atm. since ordinarily, under those conditions, optimum results are obtained. The upper pressure limit is determined only by the structural limitations of the equipment employed.

The following examples, in which parts are given by weight unless otherwise indicated, specifically illustrate the invention.

Example I

A pressure vessel was charged to about 30% of its volume with one hundred parts of cyclohexene and 3 parts of small calcium chips, sealed, and shaken for 5 hours at 185° C. under 1500 p. s. i. pressure of a carbon monoxide/hydrogen mixture (1:1 mole ratio). At the end of this time, absorption of the gas mixture had ceased. The reactor was cooled, the residual pressure released, and the contents discharged. The filtered liquid product, upon fractional distillation, yielded 37.3 parts of hexahydrobenzaldehyde (B. P. 62–65° C./29 mm.; $n_D^{27}=1.4476$), and 62 parts of unchanged cyclohexene.

Example II

A pressure reactor was charged to approximately 30% of its volume with one hundred parts of cyclohexene and 5 parts of magnesium turnings. The reactor was then connected to a source of hydrogen and pressured with this gas to 200 atmospheres and the hydrogen disconnected. Carbon monoxide was then injected until the total pressure reached 500 atmospheres. The reactor was then placed in a shaking assembly and heated to 180° C. for ten hours with shaking, during which period a pressure drop of 135 atmospheres occurred. The vessel was cooled, bled of excess gases, opened, and the liquid product discharged. Distillation of the filtered product yielded 10.3 parts of hexahydrobenzaldehyde (B. P. 55–55.5°/25 mm.) and 72 parts of unchanged cyclohexene. The 2,4-dinitrophenylhydrazone prepared from the above hexahydrobenzaldehyde melted at 173–174° C.

Example III

A silver-lined pressure vessel was charged to 15% of its capacity with 50 parts of cyclohexene and 5 parts of magnesium turnings. The vessel was sealed, pressured to 200 atm. with hydrogen, then to 500 atm. with carbon monoxide, and heated to 200° C. for 14 hrs. with agitation. The reactor was cooled and the contents were then discharged and distilled. The fifty parts of product isolated consisted of 30 parts of hexahydrobenzaldehyde (B. P. 37–38.5°/7 mm.), 17 parts of unreacted cyclohexene and 3 parts of still residue.

Example IV

A pressure vessel charged to about 30% of its volume with one hundred parts of cyclohexene and 10 parts of granulated zinc (20 mesh) was shaken for 4½ hours at 175° C. under 1000–1600 p. s. i. pressure of a carbon monoxide/hydrogen mixture (1:1 mole ratio). The reactor was cooled, the residual pressure released, and the contents discharged. The filtered liquid product, upon fractional distillation, yielded 24 parts of hexahydrobenzaldehyde (B. P. 73–74° C./45 mm.; $n_D^{25}=1.4490$), and 63 parts of unchanged cyclohexene.

Example V

The conditions of Example III were repeated replacing the magnesium by 5 parts of zinc dust and heating to 215° C. for 5½ hours. A pressure drop of 55 atm. was observed. The 48 parts of product recovered consisted of 28.8 parts of hexahydrobenzaldehyde, 16.4 parts of unreacted cyclohexene and 2.8 parts of still residue.

Example VI

Seventy-one parts of anhydrous diethyl ether and five parts of calcium turnings were placed in a pressure vessel, which was pressured with hydrogen to 200 atmospheres and then with carbon monoxide to 400 atmospheres total pressure. The vessel was shaken and heated to 190° C. and about 15 parts of butadiene-1,3 injected into the vessel during a period of one-half hour. A pressure drop of 110 atmospheres occurred during this period, at the end of which the heating was stopped, the tube cooled, the pressure released, and the contents discharged. After removal of the ether from the filtered product, fractionation yielded 15 parts of aldehydes, B. P. 51–61° C./200 mm., 3.5 parts of aldehydes, B. P. 80–100°/130 mm., and 3 parts of higher boiling residue. Redistillation of the lowest boiling fraction yielded a product, B. P. 44.5–53°/145 mm., which was shown to be a mixture of n-valeraldehyde and methylethylacetaldehyde.

Example VII

Seventy-one parts of anhydrous diethyl ether, 5 parts of magnesium turnings, and 27 parts of butadiene were sealed in a pressure vessel, which was pressured first with hydrogen to 200 atmospheres and then with carbon monoxide to 500 atmospheres total pressure. The vessel was shaken and heated to 190° C. for four hours, during which period a pressure drop of 155 atmospheres was recorded. The vessel was cooled and the product discharged. After removal of the ether, 21 parts of product remained, which consisted of a mixture of aldehydes boiling over a range from 56°/145 mm. to 87°/8 mm.

Examples of olefinic unsaturated organic compounds suitable for use in the practice of this invention include olefinic hydrocarbons, such as ethylene, propylene, the butylenes, the amylenes, the octenes, and the like; cycloolefins, for example, cyclopentene, cyclopentadiene, methyl cyclohexene, and the like; polyolefins, for example, butadiene, isoprene, piperylene, biallyl, vinylcyclohexene, cyclooctatetraene, and the like; terpenes such as camphene, pinene, dipentene, and limonene; aryl-substituted olefins, for example styrene; unsaturated ketones, aldehydes, ethers, and esters, for example, phenyl vinyl ketone, crotonaldehyde, cinnamaldehyde, vinyl methyl ether, vinyl propyl ether, the methyl and ethyl esters of acrylic, methacrylic, cinnamic, oleic, and undecylenic acids, and the like. Examples of oxocarbonyl compounds which can be prepared by the process of this invention include propionaldehyde, n-butyraldehyde, isobutyraldehyde, 2-methyl-5-isopropyl-hexahydrobenzaldehyde, hydrocinnamic aldehyde, pinane aldehyde, diethyl ketone, dibutyl ketone, dioctyl ketone, methyl 4-oxobutyrate, and 3-methoxypropionaldehyde.

Although in the examples certain conditions of temperature, pressure, reaction period, catalyst, reactants, reactant concentration, and catalyst concentration have been recited, it is to be understood that these values are subject to considerable variation within the scope of this invention. The optimum conditions will vary somewhat and are determined to a large extent by the particular olefinic unsaturated compound being treated and the catalyst employed. The process of this invention can be carried out as a batch operation as illustrated by the examples or as a semi-continuous or continuous liquid or vapor phase operation.

Although the use of a solvent is not essential, certain advantages may be derived by the use of such solvents as the cycloaliphatic hydrocarbons, for example, cyclohexane, the gasolines and aromatic hydrocarbons, for example benzene, or oxygenated solvents, for example diethyl ether.

As many apparently widely different embodiments of this invention may be made without departing from the spirit and scope thereof, it is to be understood that the invention is not limited to the specific embodiments thereof except as defined in the appended claims.

I claim:

1. A process for the preparation of an oxo-carbonyl compound which comprises reacting an olefinic unsaturated compound under superatmospheric pressure and at a temperature of at least 100° C. with a mixture of carbon monoxide and hydrogen in the presence of a metal from group II of the periodic table of elements having an atomic number from 12 to 30.

2. A process for the preparation of an oxo-carbonyl compound which comprises reacting an olefinic unsaturated hydrocarbon compound under superatmospheric pressure and at a temperature of at least 100° C. with a mixture of carbon monoxide and hydrogen in the presence of a metal from group II of the periodic table of elements having an atomic number from 12 to 30.

3. A process for the preparation of an oxo-carbonyl compound which comprises reacting an olefinic unsaturated hydrocarbon compound containing not more than two ethylenic linkages under superatmospheric pressure and at a temperature of at least 100° C. with a mixture of carbon monoxide and hydrogen in the presence of a metal from group II of the periodic table of elements having an atomic number from 12 to 30.

4. A process for the preparation of an oxo-carbonyl compound which comprises reacting a monoolefinic hydrocarbon compound under superatmospheric pressure and at a temperature of at least 100° C. with a mixture of carbon monoxide and hydrogen in the presence of a metal from group II of the periodic table of elements having an atomic number from 12 to 30.

5. A process for the preparation of hexahydrobenzaldehyde which comprises reacting cyclohexene under superatmospheric pressure and at a temperature of at least 100° C. with a mixture of carbon monoxide and hydrogen in the presence of a metal from group II of the periodic table of elements having an atomic number from 12 to 30.

6. A process for the preparation of an oxo-carbonyl compound which comprises reacting butadiene under superatmospheric pressure and at a temperature of at least 100° C. with a mixture of carbon monoxide and hydrogen in the presence of a metal from group II of the periodic table of elements having an atomic number from 12 to 30.

7. A process for the preparation of an oxo-carbonyl compound which comprises reacting an olefinic unsaturated compound under superatmospheric pressure and at a temperature of at least 100° C. with a mixture of carbon monoxide and hydrogen in the presence of a calcium catalyst.

8. A process for the preparation of an oxo-carbonyl compound which comprises reacting an olefinic unsaturated compound under superatmospheric pressure and at a temperature of at least 100° C. with a mixture of carbon monoxide and hydrogen in the presence of a zinc catalyst.

9. A process for the preparation of hexahydrobenzaldehyde which comprises reacting cyclohexene under superatmospheric pressure and at a temperature of at least 100° C. with a mixture of carbon monoxide and hydrogen in the presence of a calcium catalyst.

10. A process for the preparation of valeraldehyde which comprises reacting butadiene under superatmospheric pressure and at a temperature of at least 100° C. with a mixture of carbon monoxide and hydrogen in the presence of a calcium catalyst.

11. A process for the preparation of an oxo-carbonyl compound which comprises reacting an olefinic unsaturated compound in a solvent under superatmospheric pressure and at a temperature of at least 100° C. with a mixture of carbon monoxide and hydrogen in the presence of a metal from group II of the periodic table of elements having an atomic number from 12 to 30.

12. A process for the preparation of an oxo-carbonyl compound which comprises reacting an olefinic unsaturated compound under superatmospheric pressure of 20 to 1200 atmospheres and at a temperature of 100° to 500° C. with a mixture of carbon monoxide and hydrogen in the presence of a metal from group II of the periodic table having an atomic number from 12 to 30.

13. A process for the preparation of an oxo-carbonyl compound which comprises reacting an olefinic unsaturated compound under superatmospheric pressure of 20 to 1,200 atmospheres and at a temperature of 100° to 300° C. with a mixture of carbon monoxide and hydrogen in molar ratio ranging from about 1:4 to 4:1 in the presence of a metal from group II of the periodic table having an atomic number from 12 to 30.

GERALD M. WHITMAN.

REFERENCES CITED

The following references are of record in the file of this patent:

UNITED STATES PATENTS

| Number | Name | Date |
|---|---|---|
| 1,973,662 | Schalch | Sept. 11, 1934 |
| 2,327,066 | Roelen | Aug. 17, 1943 |